US008480526B2

(12) United States Patent
Nicholson

(10) Patent No.: US 8,480,526 B2
(45) Date of Patent: Jul. 9, 2013

(54) METHOD AND APPARATUS FOR OPERATING A MOVABLE BARRIER

(75) Inventor: Scott James Nicholson, Green Point (AU)

(73) Assignee: Chamberlain Australia Pty. Ltd., Lane Cove, NSW (AU)

( * ) Notice: Subject to any disclaimer, the term of this patent is extended or adjusted under 35 U.S.C. 154(b) by 459 days.

(21) Appl. No.: 12/775,173

(22) Filed: May 6, 2010

(65) Prior Publication Data

US 2011/0275476 A1 Nov. 10, 2011

(51) Int. Cl.
*F16H 48/06* (2006.01)
*E05F 11/00* (2006.01)

(52) U.S. Cl.
USPC .............................................. 475/149; 49/199

(58) Field of Classification Search
USPC .................... 475/149, 182, 331, 323; 74/390, 74/412 R, 608, 435, 439, 445, 448, 450; 49/197, 49/198, 199, 200; 160/184, 186, 187, 188, 160/201, 202, 207
See application file for complete search history.

(56) References Cited

U.S. PATENT DOCUMENTS

| | | | | |
|---|---|---|---|---|
| 4,043,214 | A * | 8/1977 | Westlake | 474/162 |
| 4,392,392 | A * | 7/1983 | Perisic et al. | 475/4 |
| 5,203,392 | A * | 4/1993 | Shea | 160/7 |
| 6,471,528 | B2 * | 10/2002 | Oota et al. | 439/164 |
| 6,957,681 | B2 * | 10/2005 | Kim | 160/168.1 P |
| RE40,001 | E | 1/2008 | Siegler et al. | |
| 7,607,263 | B2 * | 10/2009 | Mullet et al. | 49/200 |
| 8,011,136 | B2 * | 9/2011 | Fukumura et al. | 49/360 |
| 2009/0258752 | A1 * | 10/2009 | Bohlen et al. | 475/323 |
| 2010/0258254 | A1 * | 10/2010 | Lumbers et al. | 160/311 |

FOREIGN PATENT DOCUMENTS

WO 2007011244 A1 1/2007

* cited by examiner

*Primary Examiner* — Roger Pang
(74) *Attorney, Agent, or Firm* — Fitch Even Tabin & Flannery LLP

(57) ABSTRACT

The movable barrier operator 10 is a shaft-mounted movable barrier operator that operates a garage door 20. Such an operator includes a motor 22 operably connected to shaft 26 such that motor 22 may move door 20 between the open and closed position. Shaft 26 may include axle 36 and wheels 38. The movable barrier 10 further includes a rotational drive unit 46 with a sun gear 52 having an open center 49 into which the axle 36 extends. Further, the rotational drive unit may have an annularly shaped portion 47 and a removable portion 48 such that the operator 10 may be installed onto a previously mounted garage door. The movable barrier operator may also include protection plates or a finger guard 90.

34 Claims, 14 Drawing Sheets

200

METHOD AND APPARATUS FOR OPERATING A MOVABLE BARRIER

TECHNICAL FIELD

This invention relates generally to barrier movement operator and more specifically to the installation of an operator onto a previously installed movable barrier.

BACKGROUND

Barrier movement operators generally comprise power and control systems for responding to operator inputs and sensed conditions. Operators thereby move barriers, such as garage doors or sliding gates, between open and closed positions. Various systems for operating and controlling movable barriers have been employed.

Though many movable barriers are now installed with operating systems, previously installed systems may be retrofitted to incorporate an operating and control system onto a movable barrier. In addition, if an installed barrier operator has failed, a new operating system may need to be incorporated onto a previously installed movable barrier. In general, such systems include a primary barrier control mechanism that couples with a corresponding barrier and causes the barrier to move (typically between closed and opened positions). One known approach to installing an operator includes removing the previously installed barrier or garage door from its mount and then install the operator that is mated to the barrier prior to remounting. Many conventional operators employ a sun gear with a central bearing that is configured to mount onto an end of an axle or shaft in either of what is known in the art as a live shaft or dead shaft configuration. In such configurations, the operator extends below the axle to accommodate a sun gear that rotates around the axle. Further, installation of such a movable barrier operator typically requires that the garage door be uninstalled so that the central bearing of the sun gear may be mounted onto the axle without interference from a bracket or other mounting structure. This, of course, can be cumbersome, error prone, and time consuming to accomplish, especially considering the size, weight, and shape of many movable barriers. Alternatively, some installers disconnect a portion of the barrier to avoid removing the entire mounted movable barrier from its mounted position. To that end, an installer may release one side of a mounted barrier, and may then rotate the barrier off a single side to partially remove a previously installed movable barrier. Such rotation and movement, however, may be dangerous due to the weight of the door and may also require specialized equipment.

In practice, though, some garage doors have been installed into spaces with little additional room to accommodate conventional operators. In such circumstances, even removing the movable barrier from the door mount may not permit an operator and controller to be installed into an insufficient space. Further, such space restrictions can, in fact, limit the use of operators for newly designed garage doors and openings where space is limited.

Conventional garage door operators such as rack and pinion drives or push-pull drive chain types are suitable for use in larger garage spaces which allow for hanger brackets to be connected from the ceiling to provide a rail for a drive chain that is connected to a trolley, which is movable along the rail. However, many garages, such as older garages, have relatively low ceilings and relatively little additional space to accommodate such conventional operators. In such circumstances, a shaft-mounted operator or jackshaft operator is often used to operate movement of the barrier. Jackshaft operators are suitable for use with garages having low ceilings or other space limitations as they do not require the additional center rail and trolley. One example of a jackshaft operation is described in U.S. Pat. No. RE40,001, which is incorporated by reference as through fully rewritten herein. A jackshaft operator typically has a motor with a motor housing and a control unit. The motor is operably connected to a jackshaft that is positioned parallel to an upper edge of the door and rotatably mounted above the garage door frame. A torsion spring may be wound around the jack shaft to provide a restoring force to it.

The jackshaft operator is typically mounted inside a parking structure or garage on a wall thereof immediately above the door opening and slightly offset, near a corner edge thereof. The jackshaft operator is operably connected to the jack shaft, which comprises a portion of the garage door structure and has a torque-providing helical spring wound thereabout for providing a restoring torque to the jackshaft. While such jackshaft operators occupy minimal space compared to operators having a rail and trolley configuration, some jackshaft operators still employs L-shaped tracks into which rollers attached to the garage door are permitted to ride, thereby guiding movement of the barrier from the open to closed position. The tracks may require additional installation and can be difficult for very small spaces to accommodate.

In addition, installing such an operator to a previously mounted garage door, as mentioned, can be quite difficult, especially considering the weight of a typical garage doors and barriers. For example, some operator configurations require that the previously mounted garage door be dismounted so that the operator can be positioned and properly mated with the garage door. Further, some garage doors have low ceilings and little additional room for a movable barrier operator that is significantly offset from the opening. For example, in a garage where the wall surrounding the opening adjoins another wall near that opening such that the space between the opening and the adjoining wall is limited.

SUMMARY

Generally speaking, and pursuant to these various embodiments, an operator, as described herein, includes a motor with a motor housing and drive gear. Further, it is contemplated that the operator includes a rotational drive unit with a sun gear that engages the drive gear along a circumference of the sun gear. In one approach, the drive gear and the sun gear support are positioned off-set from the rotational center of the sun gear and engage the circumference of the sun gear such that neither the sun gear nor the rotational drive unit is supported by a central bearing at its rotational axis. In one approach, the sun gear is configured to couple with a movable barrier to move the barrier between the first and second position. In one aspect, the apparatus may be configured to couple to a movable barrier in one of a live-shaft configuration or a dead-shaft configuration. In another one aspect, the sun gear support includes several bearings such as first and second gear supports positioned off-set from the center of the sun gear. In still another aspect, the sun gear support includes an arcuate lip or another gear.

In another approach, a shaft-mounted operator includes a motor, motor housing, and sun gear driven by the motor, where the sun gear has a removable portion allowing assembly of the sun gear onto the shaft without removal of the shaft and garage door from their installed position. An annular, first portion of the sun gear includes openings that are configured to receive portions of a second, removable portion thereby mating the removable portion of the sun gear with the annular portion of the sun gear. Further, the sun gear is configured to be slidably mounted onto a previously installed movable barrier without removing the movable barrier. In addition, once the annular portion of the sun gear and associated motor housing have been connected to the shaft, the removable portion of the sun gear may be connected to the remainder of the sun gear.

So configured, a conveniently mountable movable barrier operator may be mounted into less than ideals locations, such as a confined space that would typically not accommodate a conventional movable barrier operator. Such a mountable movable barrier operator would be conveniently mountable proximate the shaft and is smaller to thereby accommodate a variety of installation configurations and save costs. Further, such a conveniently mountable operator is lighter and, therefore, easier to install. One such movable barrier operator, such as a shaft-mounted operator, then may be installed onto a previously installed movable barrier without requiring removal of a previously installed barrier from its mount.

In one configuration, a portion of the sun gear extends beyond the motor housing. The In one such approach, a protection mechanism, such as protection plate(s), is connected to the motor housing between the housing and the sun gear. The plate(s) being movable between two positions where one of the positions substantially covers the portion of the sun gear that extends beyond the motor housing and another position that exposes a portion of the sun gear that extends beyond the motor housing. The plate position exposing a portion of the sun gear that extends below the housing is used when the removable portion of the sun gear is mated with the annular portion of the sun gear.

So configured, a movable barrier operator may include a protection mechanism, such as a finger guard, that does not require removal of the protection mechanism for assembly or installation of the operator.

In one approach, a method of installing an operator onto a previously installed movable barrier includes providing a motor, a motor housing, a drive gear, an associated sun gear, and a protection plate. The method further includes arranging the protection plate into a position substantially exposing the portion of the sun gear extending beyond the motor housing. The sun gear having an annular shaped body with an opening and an open center, the opening of the annular body configured to receive a removable sun gear portion. The method also includes mounting the motor housing and associated sun gear to a shaft supporting a garage door, while the removable portion of the sun gear is removed. Once the operator is positioned adjacent the shaft, the removable portion of the sun gear is mated to the annularly shaped body of the sun gear. The removable portion may have a first projection and a second projection that may extend through first and second apertures in the annular shaped body of the sun gear where the first and second projections are configured to engage a portion of the installed movable barrier. The method of installation also includes positioning the protection plate in a position substantially covering the portion of the sun gear that extends beyond the motor housing.

BRIEF DESCRIPTION OF THE DRAWINGS

The above needs are at least partially met through provision of the method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
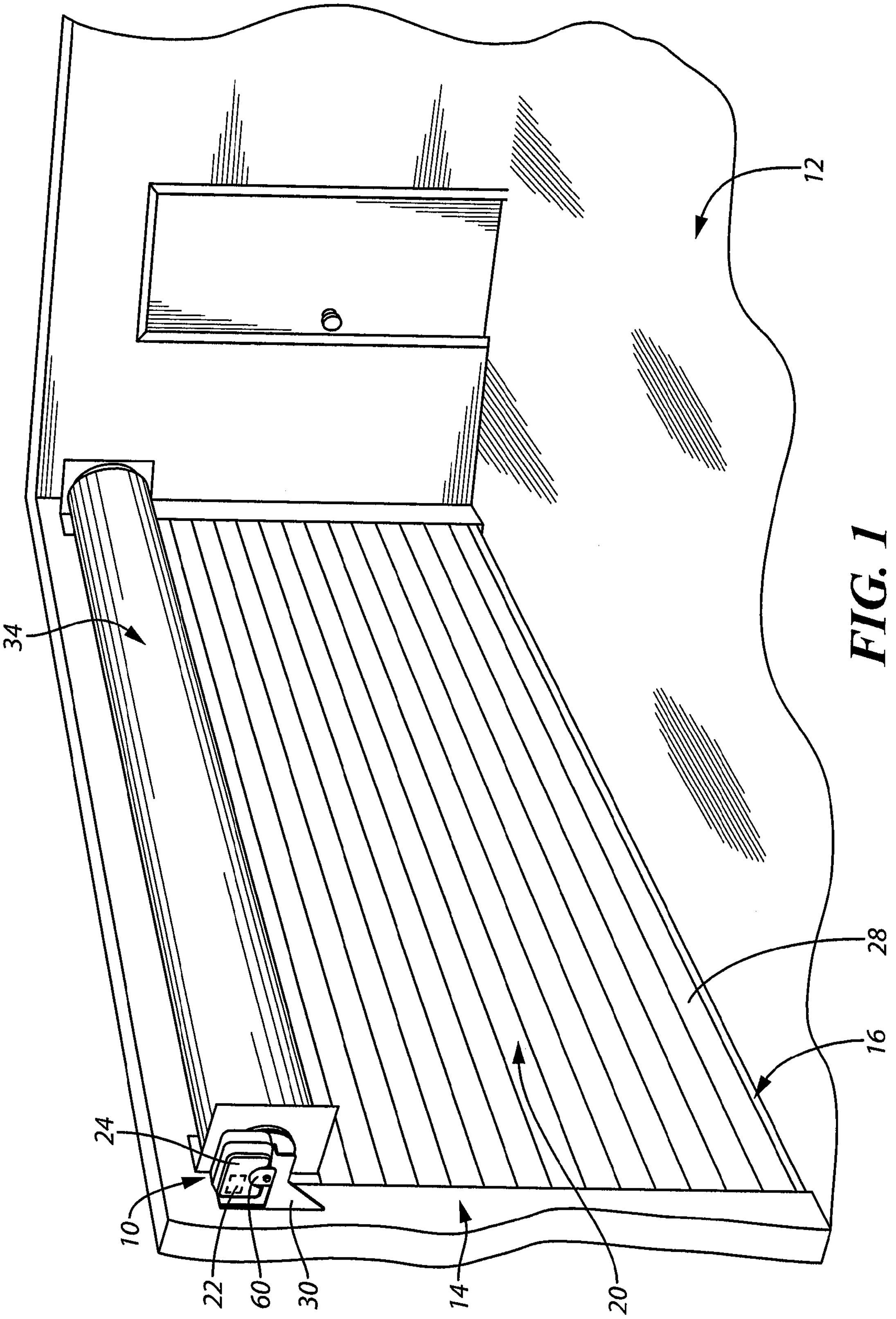
FIG. 1 comprises a perspective view of an inside of a garage with a movable barrier and operator as configured in accordance with various embodiments of the invention.
Figure 2:
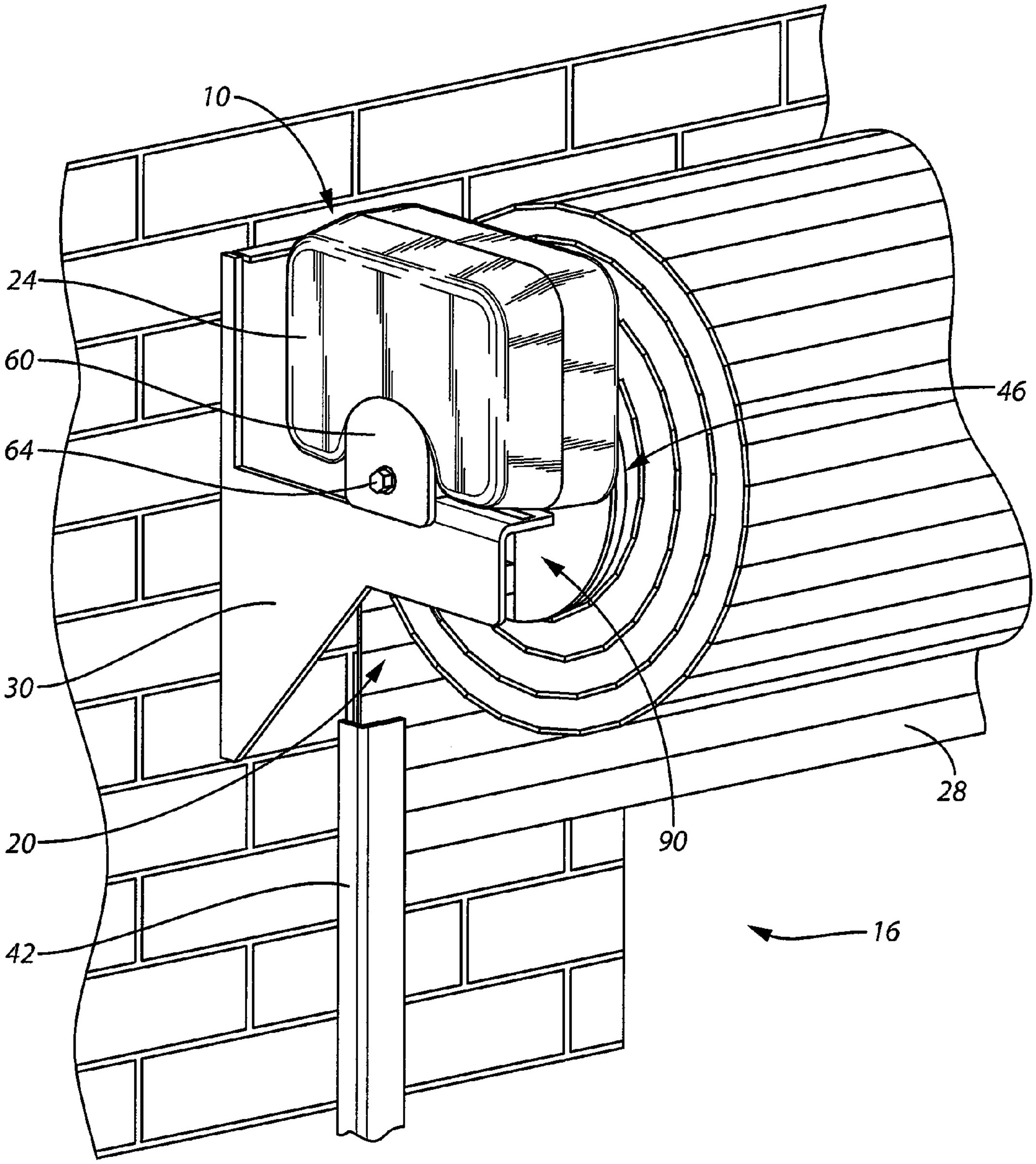
FIG. 2 comprises an enlarged perspective view of a portion of an inside of a garage with a movable barrier and operator as configured in accordance with various embodiments of the invention.
Figure 3:
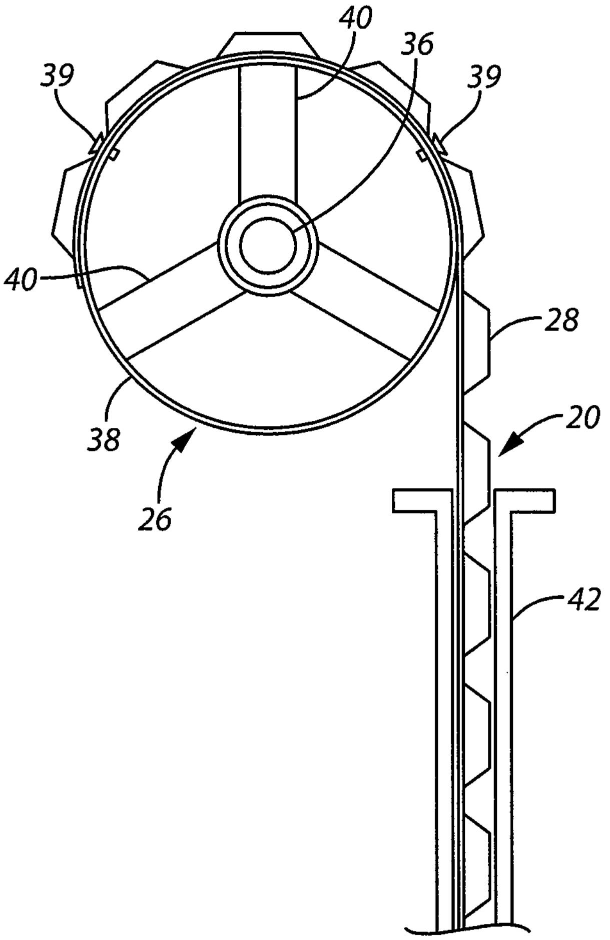
FIG. 3 comprises a schematic cross section of a portion of the movable barrier as configured in various embodiments of the invention.

Referring now to the drawings, and in particular to FIGS. 1-3, a movable barrier operator is shown therein denoted as reference 10. The movable barrier operator 10, as illustrated, is a shaft-mounted movable barrier operator that is mounted inside a parking structure or garage 12 on a wall 14 immediately above the opening 16, which is closed by a barrier or garage door 20. The movable barrier operator 10 includes a motor 22 inside motor housing 24, the motor 22 being operably connected to a shaft 26 such that the motor 22 may move the door 20 between the open and closed position. The shaft 26 may extend across and just above the garage opening 16. The garage door 20 is supported by the shaft 26, which is supported at the ends by a door mount such as a bracket 30. As used herein, a shaft-mounted movable barrier operator is one that is mounted proximate the shaft, such as those mounted onto the axle, the bracket supporting the shaft, or through another mounting configuration. Further, the shaft 26 may include an axle 36 and wheels 38 mounted thereto.

As illustrated in FIG. 1, the barrier may be a multi-panel garage door or barrier curtain 20. By one approach, the multi-panel garage door 20 includes long rectangular door panels or slats 28 that are hingedly attached to one another. The garage door 20 is supported in part by the shaft 26, portions of which may be rotatable and portions of which may be fixed. In one example discussed below, the shaft 26 is comprised of an axle 36 and at least two wheels 38. Further, in one illustrative embodiment, the axle 36 has two wheels 38 mounted thereon, one located proximate each end of the axle 36. Such an embodiment, as installed, permits the wheels 38 to rotate around the axle 36, thereby winding the door therearound. Further, by one approach, the multi-panel garage door 20 is a roll type door, similar to a roller shade for home windows, such that at least some of the slats 28 will wrap around shaft 26 when the door 20 is raised and the garage opening 16 is exposed. In one illustrative embodiment, the garage door 20 is fixedly connected to the wheels 38 such that when the wheels 38 are rotated by the movable barrier operator 10, slats 28 are wrapped therearound. Further, the garage door 20 may be any type of movable barrier, such as a rolling window shade, window protector, or an awning, in addition to a garage door. An enlarged perspective illustrated in FIG. 2, shows the movable barrier operator 10 proximate a side of the garage door 20 and opening 16. Further, the garage door 20, via the shaft 26, is supported by a bracket 44, which is positioned above the opening 16. In one illustrative approach, a door, such as a metal door, may have insulation attached thereto. Alternatively, the door may be comprised solely of metal. A variety of metals may be used to construct the door. Materials for the motor housing may include any of a variety of metals or hard plastics. In addition, the brackets, axles, and wheels are also generally comprised of any of a variety of metals.

In one example illustration shown in FIG. 3, the shaft 26 is schematically shown at the side of opening 16. Further, the shaft 26 includes an axle 36 (which extends along the length of and just above the opening 16) and a wheel 38 mounted thereto, though other configurations are contemplated. Further, by one approach, the wheel 38 has three spokes 40. By another approach, the wheel 38 may have more or fewer spokes or, alternatively, may be disk-like and have no spokes. The garage door 20 is connected to a portion of the circumference of the wheel 38. By one approach, a few of the uppermost panels or slats 28 are secured to the wheel 38 by fasteners 39. Thus, when the wheel 38 is rotated, the door 20 will wind or unwind around the wheel 38 and the axle 36 thereby raising or lowering the garage door 20. By one approach, the wheel 38 has a bearing incorporated therein, such as a roller bearing, to further facilitate movement of the wheel 38 relative to the axle 36. In yet another approach, the axle 36 may incorporate a bearing, such as a roller bearing, to further facilitate movement of the wheel 38. Tracks 42 may be included to act as guides for the ends of the garage door 20.

As installed, one of the at least two wheels 38 is positioned proximate an end of the axle that is adjacent the operator 10. As mentioned, the garage door 20 may be raised or lowered by rotation of wheel 38 because the door 20 is fixedly attached to the wheel 38 by the fasteners 39. To that end, a portion of the operator 10 engages with spokes 40 of the wheel 38 to rotate the wheel 38 and thereby move the garage door 20. When the wheel 38 is rotated, the garage door 20, which is secured to the wheel 38, is wound or unwound around the wheel 38 and the axle 36. As the door 20 is further wound around the wheel 38, a drum-like structure is formed having the axle 36 at its center, garage door slats 28 along the circumference of the drum-like structure, and the wheels 38 at the ends. In addition, a torsion spring may be wrapped around the axle in between the two wheels 38.

In one configuration illustrated in FIG. 1, the shaft 26 including the axle 36 and wheels 38 are contained within a shell 34 such that as the door 20 is raised, the slats 28 are wound around shaft 26 and are pulled into the shell 34. The shell 34, like the shaft 26, is positioned above the opening 16 of the garage 12. In another configuration illustrated in FIG. 2, the garage door 20 may be wound around the shaft 26 where the shaft 26 is not housed within a shell. At the sides of the opening 16, the tracks 42 are positioned such that the ends of the slats 28 are positioned therein. As the door 20 is raised and lowered, the ends of the slats 28 ride within the tracks 42 such that movement of door 20 is guided by the tracks.

As mentioned, garage door 20 may be raised and lowered by movable barrier operator 10. Operators for such roll-type doors are generally attached to a point of reference, such as the axle 36 or the bracket 30, while being positioned to engage the wheel 38. In one approach, operator 10 is mounted onto axle 36 such that a portion of operator 10 engages the spokes of wheel 38, thereby rotating the wheel about the stationary axle.

Figure 8:
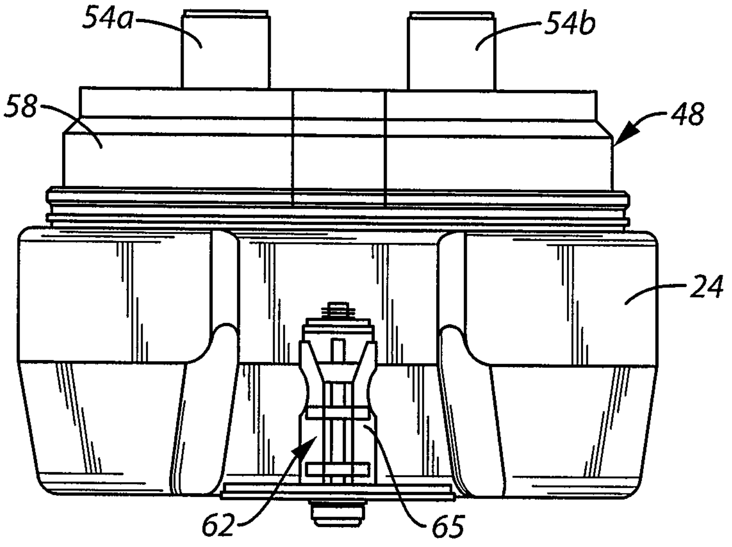
FIG. 8 comprises a bottom view of the movable barrier operator of FIG. 4 as configured in accordance with various embodiments of the invention.
Figure 18:
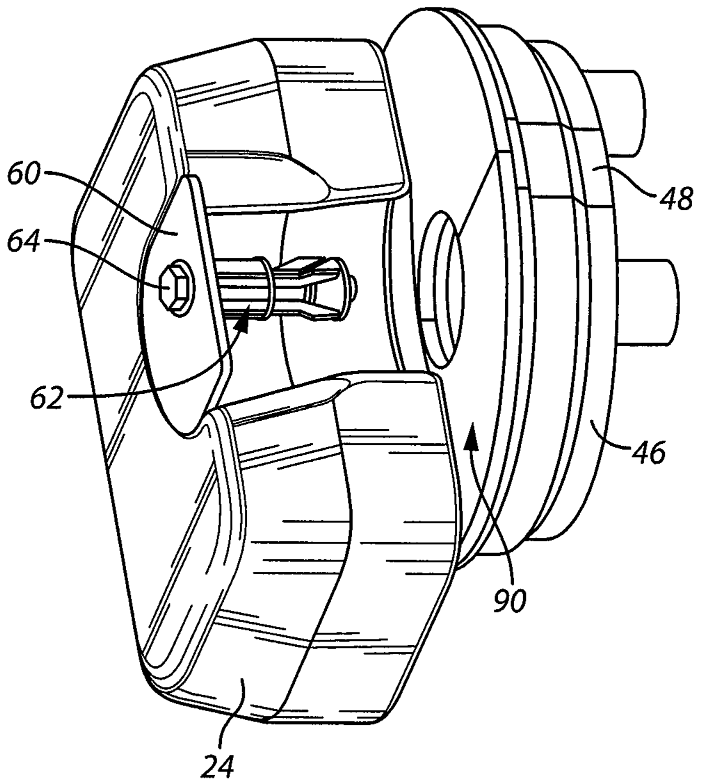
FIG. 18 comprises a bottom perspective view of a movable barrier operator with an expandable coupler, as configured with various embodiments of the invention.

FIGS. 1 and 2 illustrate one example of the movable barrier operator 10 having a support panel or housing bracket 60, which connects to an expandable shaft coupling 62 (FIG. 8). In one illustrative approach, the support panel 60 extends from inside the housing 24, where it can be secured to the remainder of operator 10 in a variety of manners. The expandable shaft coupling 62, illustrated in FIGS. 8 and 18, fixedly attaches the operator 10 to the axle 36 by engaging the inside surface of the axle. By one approach, the expandable shaft coupling 62 is comprised of a fairly hard metal that secures the operator 10 to the axle 36. The expandable shaft coupling 62 is configured to be positioned within the end of the hollow axle 36, and when a bolt 64 therein is turned, the expandable shaft coupling 62 expands outward. By one approach, the expandable shaft coupling 62 has wings 65, and when the bolt 64 is rotated the wings 65 may expand outward to grip or dig into the interior surface of the axle 36. In one example, the wings 65 will dig into the interior surface of the axle 36 such that small indentations are made in the surface to help hold the expandable coupled 62 and the operator 10 in position.

As mentioned, the expandable shaft coupling 62 is configured to expand when adjusted to clamp the movable barrier operator 10 to axle 36 by the shaft coupling 62 clamping to the inside of the hollow axle 36. Further, the expandable shaft coupling 62 may be used for either dead shaft configurations (bearings are located on the wheels that rotate) or live shaft configurations (bearings are mounted on the axle), whereas many previous couplers mountable to the outside of the axle were only mountable on dead shaft configurations so that the coupler would not interfere with bearings mounted on the axle. The expandable shaft coupling 62 is fixedly attached to the support 60 by a bolt 64 that extends through the panel 60 to the coupling 62. Conventional couplers that clamped onto the exterior of the axle are also generally bigger than the axle to grip the outside surface of the axle. In addition, conventional couplers sometimes required that the shell 34 be adjusted so as to provide access to the axle 36. By having the expandable shaft coupling 62 engage the interior of the hollow axle, the coupling between the motor and shaft is smaller and lighter, and therefore, less expensive than would otherwise be necessary and generally does not require shell adjustment when accessing the axle. An expandable shaft coupling 62 generally provides for easier installation and reinstallation, such as when the door or motor are removed for maintenance, because in certain spaces there is limited space for maneuvering hands and tools.

As installed, the movable barrier operator 10 may be positioned primarily above the axle 36 such that the support 60 extends adjacent and slightly below an end of the axle 36 as shown in FIGS. 1 and 2. As mentioned, the bolt 64 extends through the support 60 to the axle 36 thereby securing the movable barrier operator 10 to the axle. By one approach, having the movable barrier operator 10 with an open center 45 permits the housing 24 to be mounted primarily above the axle and does not require the housing of the operator to extend significantly past the end of the axle 26 or significantly below the axle 36. In this example, by not having a central bearing in the sun gear attached to the motor housing, the operator housing does not extend significantly below the axle.

Figure 4:
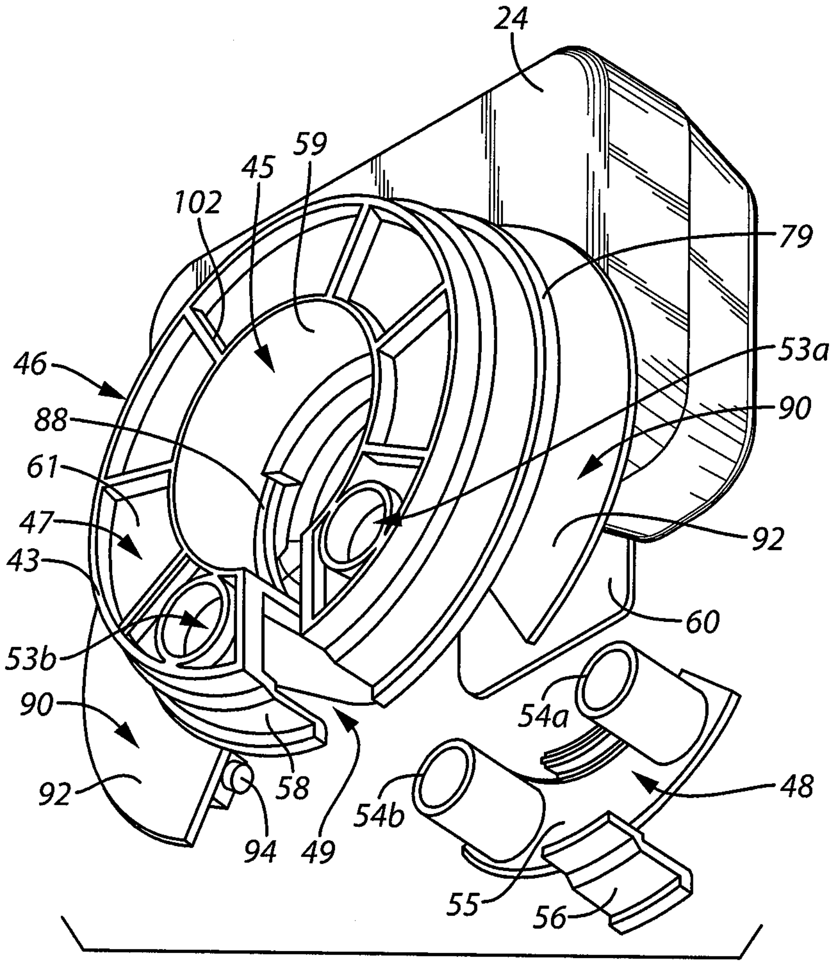
FIG. 4 comprises a perspective view of a movable barrier operator with a portion of a sun gear removed as configured in accordance with various embodiments of the invention.
Figure 9:
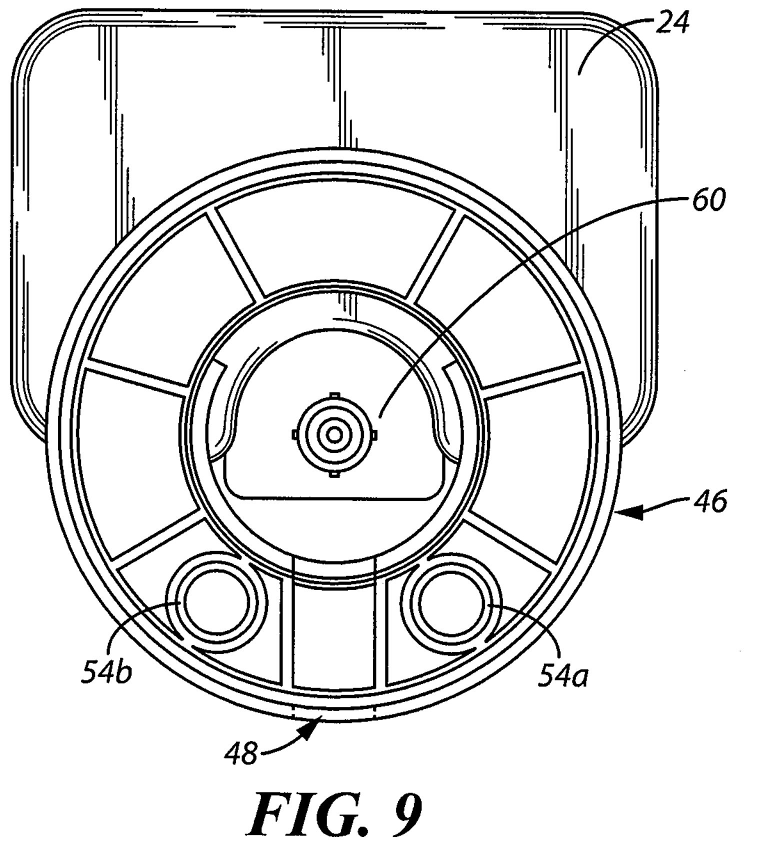
FIG. 9 comprises a front view of the movable barrier operator of FIG. 4 as configured in accordance with various embodiments of the invention.

Turning now to FIG. 4, a side of the example movable barrier operator 10 is illustrated that faces the wheel 38 and is the side opposite that illustrated in FIGS. 1 and 2. The movable barrier operator 10, as shown, includes a rotational drive unit 46 with an open center 45 through which the axle 36 may pass. The rotational drive unit 46 also has an annularly shaped portion 47 and a removable portion 48 illustrated having projections 54. By one approach, the rotational drive unit 46 may be constructed of a hardened plastic. By yet, another approach, the rotational drive unit 46 may be constructed of a sintered or molded metal. The rotational drive unit 46 is rotated by the motor 22 housed inside motor housing 24. To this end, the rotational drive unit 46 includes the sun gear 52 that is disposed on both the annularly-shaped first portion 47 and the removable second portion 48. The rotational drive unit 46 is operably attached to the motor housing 24 through several supports positioned off-center from the rotational axis of the drive unit. As mentioned above, a central bearing is not employed to mount the rotational drive unit 46. The off-center supports, illustrated in FIGS. 14-16, may be arranged in a number of configurations. The first portion 47, which is annularly-shaped, has an open center 45 and an opening 49. The opening 49 is configured to receive the second removable portion 48 and, likewise, the second removable portion 48 is configured to mate with first portion 47 at the opening 49 to thereby complete the circular path of the circumference of the rotational drive unit 46, as illustrated in FIG. 9. In addition, the rotational drive unit 46 also includes strengthening ribs 102 that permit the rotational drive unit 46 to be reinforced without unduly increasing the weight of the rotational drive unit 46 and the associated sun gear 52.

Figure 5:
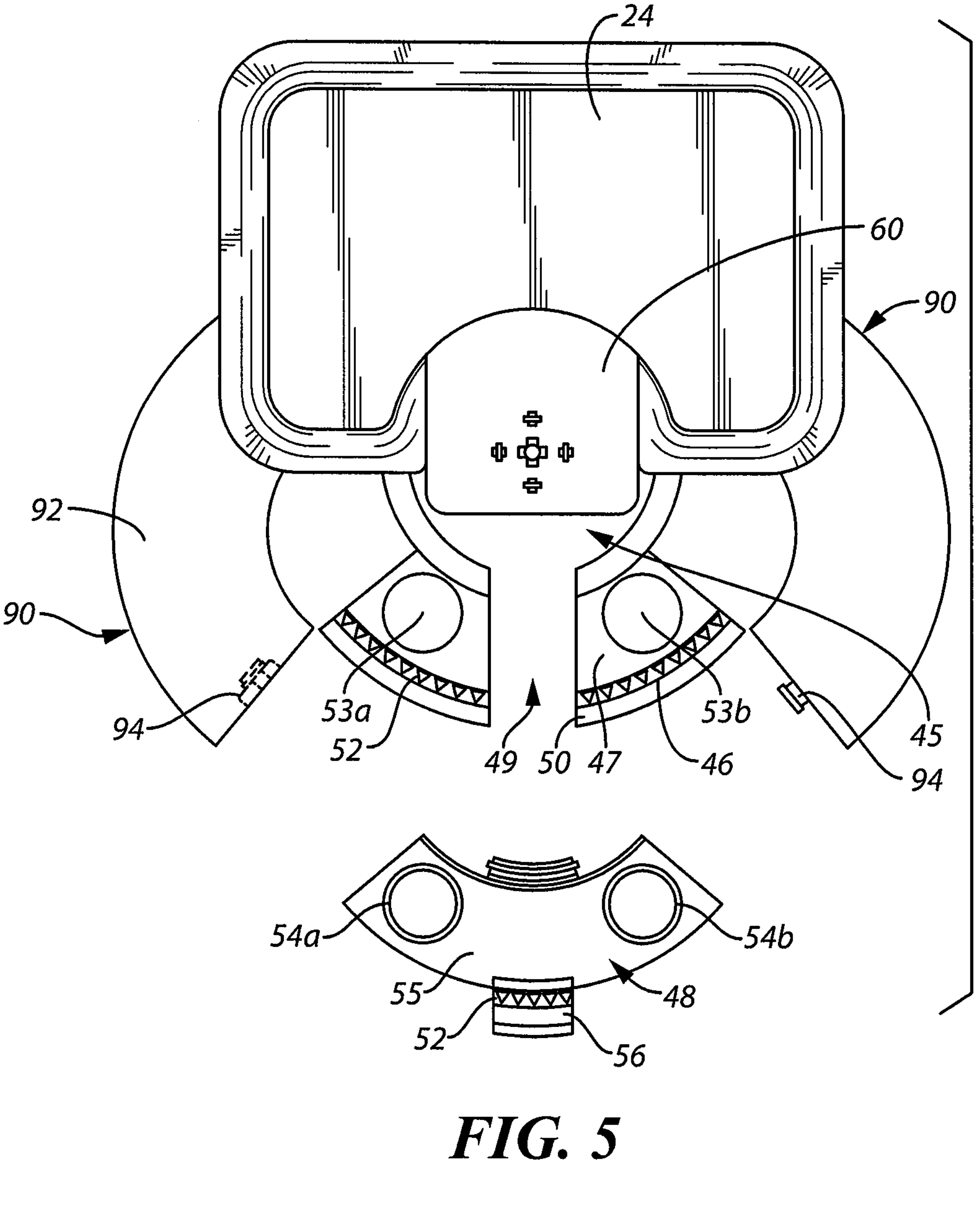
FIG. 5 comprises a back view of the movable barrier operator of FIG. 4 having protection plates in a position exposing a portion of the sun gear, as configured in accordance with various embodiments of the invention.
Figure 10:
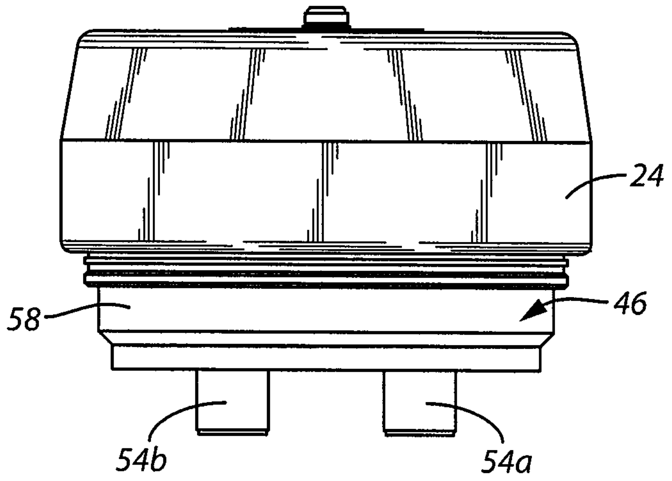
FIG. 10 comprises a top view of the movable barrier operator of FIG. 4 as configured in accordance with various embodiments of the invention.
Figure 11:
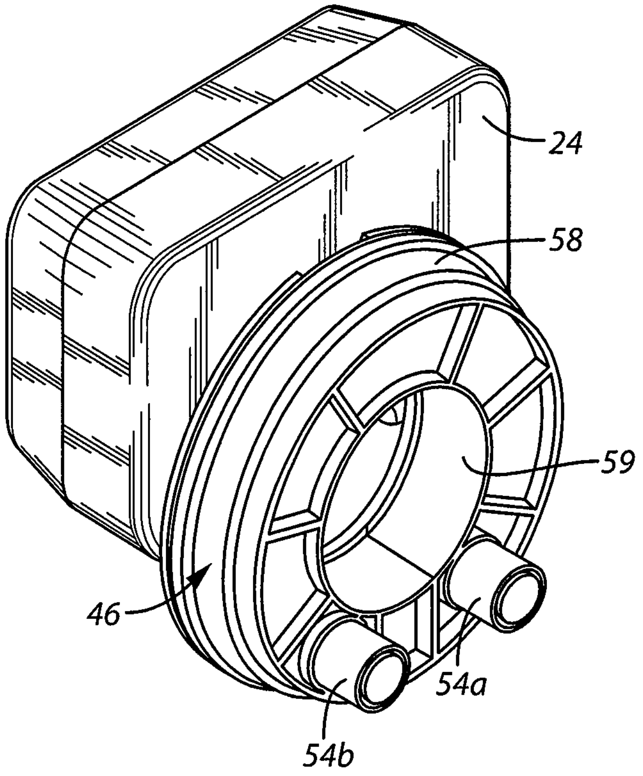
FIG. 11 comprises a perspective view of the movable barrier of FIG. 4 having the removable portion of the sun gear mated therewith, as configured in accordance with various embodiments of the invention.
Figure 12:
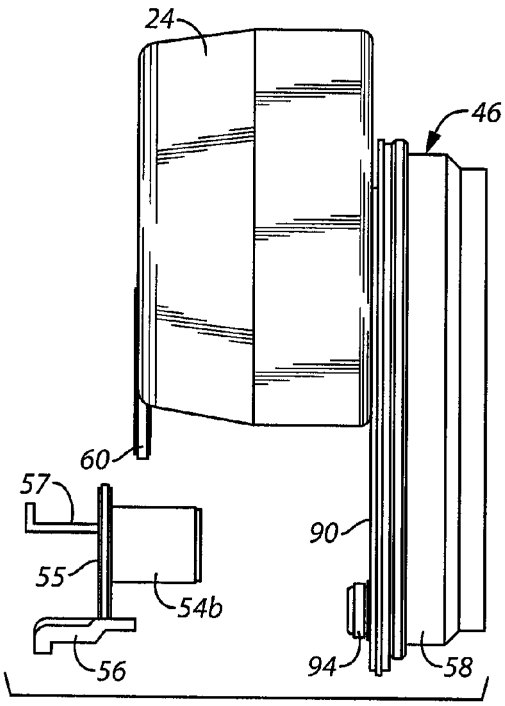
FIG. 12 comprises a side view of the movable barrier of FIG. 4 having the removable portion of the sun gear removed therefrom, as configured in accordance with various embodiments of the invention.
Figure 13:
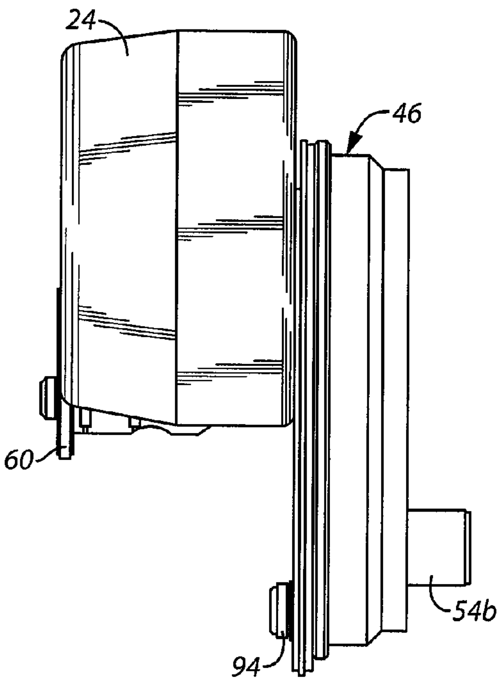
FIG. 13 comprises a side view of the movable barrier of FIG. 4 having the removable portion of the sun gear mated therewith, as configured in accordance with various embodiments of the invention.

More specifically, and with continuing reference to FIGS. 4 and 5, the annularly-shaped first portion 47 includes two apertures 53 adjacent the opening 49. Portions of removable portion 48 are extendable through apertures 53 and portions mate with the opening 49. The first and second apertures 53 are disposed proximate opening 49 on either side thereof. The removable portion 48 includes projections 54 that are extendable through apertures 53 in the first portion 47 of the rotational drive unit 46. Further, a first projection 54*a* is configured to extend through a first aperture 53*a* and a second projection 54*b* is configured to extend through a second aperture 53*b*. FIGS. 8 and 10-11 illustrate the removable portion 48 mated with the first portion 47 to complete the removable drive unit 46. As the removable portion 48 is mated with the first portion 47, projections 54 extend through apertures 53 and into engagement with the spokes 40 of the wheel 38 when installed. Further, the projections 54 are operable to move the installed movable barrier from a first position to a second position as they are rotated. Thus, such a mated configuration of the portions of the rotation drive unit 46 is employed during operation of movable barrier operator 10.

The annularly-shaped first portion 47 includes two sidewalls 58 and 59 and a plate 61 that is configured to join the two sidewalls together proximate a side of the rotational drive unit 46 that faces the wheel 38. The sidewalls 58 and 59 follow a circular path wherein the outer sidewall 58 has a larger circumference, while the inner sidewall 59 has a smaller circumference. The apertures 53 extend through plate 61 in between the two sidewalls 58, 59.

The removable portion 48 also includes a center plate 55 that is curved in shape to follow the opening 49 in the annular shape of rotational drive unit 46. The removable portion 48 includes a flange 56 that is arcuate in shape to follow a side wall 58 of the annularly shaped rotational drive unit 46. The flange 56 aligns with the side wall 58 when the removable portion 48 is mated with the first portion 47. The flange 56 extends from the plate 55 in a direction opposite the projections 54. The flange 56 and the plate 55 may have portions of the sun gear 52 disposed thereon, as discussed below. Further, the removable portion 48 also includes wall portion 57 that aligns with the inner side wall 59 of the rotational drive unit 46 when the removable portion 48 is mated with the first portion 47.

When the removable portion 48 has been mated with the remainder of the rotational drive unit 46, the projections 54 of the removable portion 48 engage portions of the wheel 38. More specifically, the projections 54 engage one of the spokes 40 of the wheel 38. Further, a single spoke 40 is typically captured in between the projections 54*a*, 54*b* such that one of the projections extends along each side of the spoke.

The rotational drive unit 46 has a first side 43 that, when installed, faces the wheel 38 and is illustrated in FIG. 4. A second side 50 is opposite the first side 43, and the second side 50 faces the motor housing 24. A portion of second side 50 is illustrated in FIG. 5 where the finger guard 90 is moved to expose a portion of the sun gear 52 that is disposed on the side 50 of rotational drive unit 46 and that extends beyond the motor housing 24. Once the removable portion 48 has been mated with the first portion 47, the rotational drive unit 46 may be rotated by the motor 22 in the housing 24. Such rotation occurs through a driving gear operably connected to the motor 22 that engages the sun gear 52 disposed on the rotational drive unit 46. The sun gear 52, including its gear teeth, is disposed upon both the removable portion 48 and the first portion 47 of the rotational drive unit 46. More particularly, when the removable portion 48 is mated with the annular portion 47, the gear teeth of the sun gear 52 align such that the rotational drive unit 46 may be rotated by a driving gear as if the removable portion 48 were formed as a single, unitary rotatable gear unit with the first portion 47. The motor 22 engages gear teeth of the sun gear 52 by a drive mechanism such as a pinion gear assembly. By one approach the gear teeth of the sun gear 52 are primarily disposed on the interior surface of sidewall 58 of the rotational drive unit 46. As the motor 22 rotates a pinion gear assembly, the rotational drive unit 46 is rotated along with the projections 54. The projections 54 rotate the wheel 38 by engaging one of the spokes 40 of the wheel. In one embodiment, a release mechanism may be configured to permit the user to decouple the pinion and the motor 22 such that the pinion is no longer engaged and the door can be operated independent of the operator.

In one approach, the wheels 38 are free to rotate about the axle 36 that is constrained from rotation via bearings incorporated into the wheel 38. By another approach, the axle being constrained from rotation has bearings mounted thereon such that the wheels 38 are free to rotate around by engaging the bearings mounted on the axle 36. Either configuration may permit rotation of the wheels 38 around the axle 36. Further, as the wheels 38 rotate, the door 20 is wound around the wheels 38 and axel 36. As mentioned above, the movable barrier operator 10 rotates the wheels 38 to raise or lower the garage door and such operators have typically required removal of the door from its mount in order to install the operator. The movable barrier operator 10, however, includes a removable portion 48 that permits installation of the operator 10 onto the axle 36 without removal of the door 30 and shaft 26 from the mounting brackets 44. Indeed, the removable portion 48 permits the rotational drive unit 46 to be mounted to engage the wheel 38 as it rotates around the axle 36.

As installed, the projections 54 of the rotational drive unit 46 will rotate around the axle 36, along with the wheel 38. Thus, the axle 36 may extend into the open center 45 of the rotational drive unit 46 such that the projections 54 rotate around the axle 36 positioned in the open center of the rotational drive unit 46. Indeed, it is anticipated that in many configurations the axle 38 will extend into the open center 45 to engage the expandable shaft coupling 62 with the axle 36 and to position the projections 54 to contact the wheel 38. As the projections 54 rotate around the axle 36, the projections contact spokes 40 such that the wheel 38 is rotated and the door is wound or unwound around the shaft 26.

Installing movable barrier operators may be accomplished in a number of manners. For example, the movable barrier operator 10 may be installed at the same time as the garage door 20, which permits the installer to mount the operator on the axle at the same time as the door is installed. Alternatively, while conventional operators required the user to remove a mounted barrier in order to permit the operator to be properly coupled to the barrier, the movable barrier operator 10 may be mounted to a previously installed door without requiring removal of the door. To that end, the movable barrier operator 10 is configured to be mounted onto a previously installed movable barrier by having the removable portion 48 removed therefrom. Thus, the opening 49 in the first portion 47 of the rotational drive unit 46 permits the axle 36 to be positioned within the center opening 45 such that the rotational drive unit 46 is proximate the wheel 38. The operator 10 is slid onto the axle 36 via the opening 49, after which the coupling 62 may secure the operator 10 to the axle 36. Further, once the movable barrier operator 10 is positioned adjacent the wheel and axle end, the removable portion 48 may be mated with the opening 49, the apertures 53, and the wheel 38. In one illustrative embodiment, the expandable coupling 62 may be mated to the axle 36 prior to mating the removable portion 48 with the remainder of drive unit 46. Alternatively, in some configurations the removable portion 48 may be mated with rotational drive unit 46 prior to securing the expandable coupling 62 to the axle 36.

Figure 14:
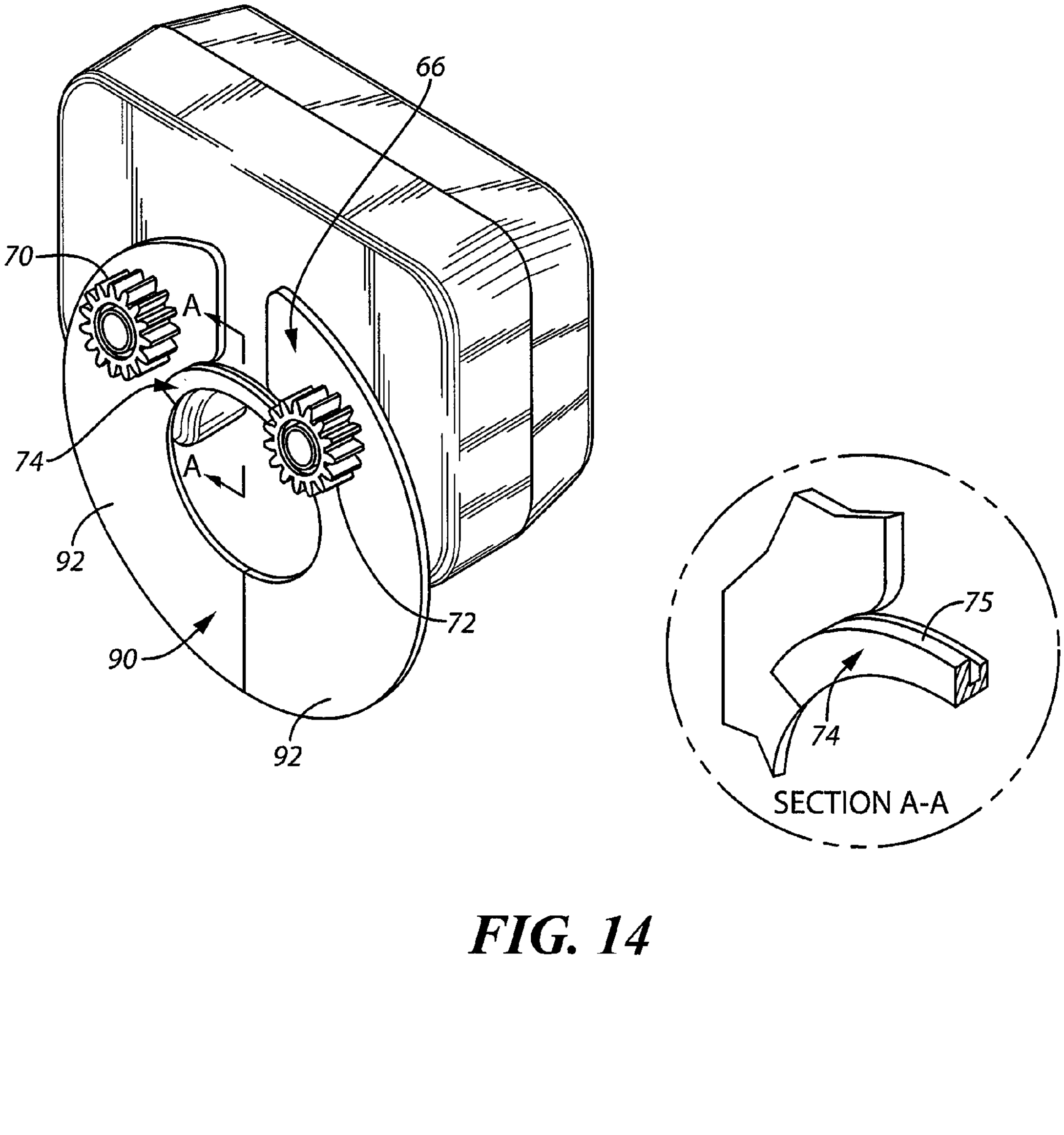
FIG. 14 comprises a perspective view of a portion of a movable barrier operator having the sun gear removed as configured in accordance with various embodiments of the invention.
Figure 15:
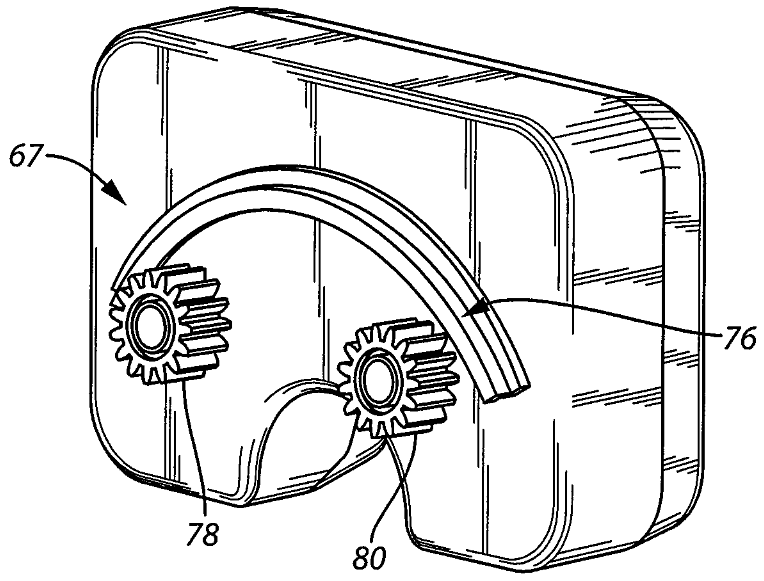
FIG. 15 comprises a perspective view of an alternative configuration of a movable barrier operator, as configured in accordance with various embodiments of the invention.
Figure 16:
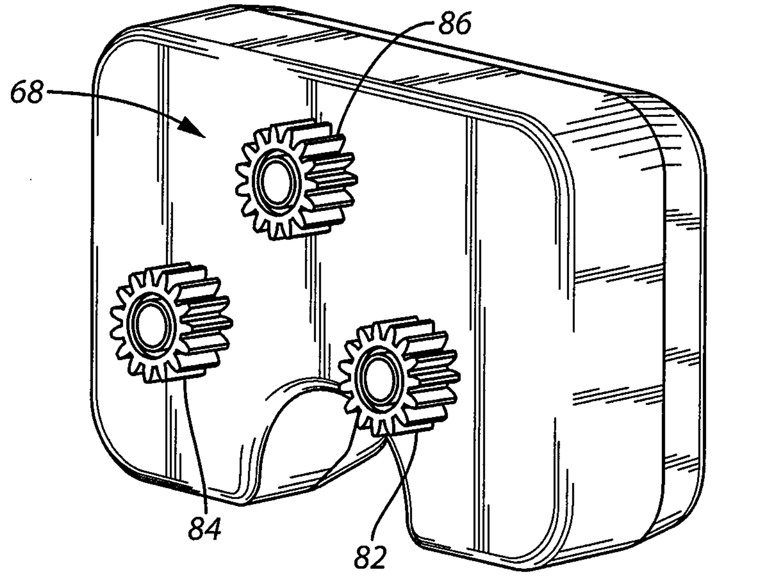
FIG. 16 comprises a perspective view of an alternative configuration of a movable barrier operator, as configured in accordance with various embodiments of the invention.

Turning now to FIGS. 14-16, several support configurations for the rotational drive unit 46 are illustrated. While conventional operators have a central bearing associated with the sun gear, the three-point support for a sun gear described herein removes the need for such a central bearing, thereby opening up the potential size and shape of the operator. Further, by removing the central bearing, the operator housing does not need to extend significantly below the center line of the sun gear and the size of the operator may be smaller. Further, possible shapes for the operator are increased because they are not as constrained by the requirement to support the central bearing. To this end, the rotational drive unit 46, including the sun gear 52, is supported by three points of engagement with the housing 24 via the bearing assembly 66, 67, and 68. A variety of points of engagement or bearings are contemplated such as gears (both pinion and idlers gears) and plain bearings such as an arcuate surface configured to permit rotation of the rotational drive unit, to note but a few bearings.

By one approach, examples of which are shown in FIGS. 14-16, two of the bearings are located on the interior of the rotational drive unit 46, thereby engaging the sun gear 52. In such a configuration, a third bearing engages an outer surface of the rotational drive unit 46. The bearing engaging the outer surface of the rotational drive unit 46 may engage either the sidewall 58 or 59. By another approach, two bearings are positioned to engage an outer surface of the rotation drive unit 46, while a third bearing engages an interior surface of the rotational drive unit 46. In both configurations, at least one pinion gear is positioned to engage an inside surface of the rotational drive unit 46 having sun gear 52 disposed thereon. Alternatively, three gears may be used to engage the interior of the rotational drive unit 46 such that two of the gears engage one of the sidewalls and the other of the three gears engages the other of the sidewalls. In yet another approach, the bearing assembly may have one gear engaging the inside surface of the rotational drive unit and two gears engaging the outer surface of the drive unit.

As mentioned, the rotational drive unit 46 is driven by a pinion gear that engages the sun gear 52 on the side 50 of the drive unit 46. One such three-point support configuration, shown in FIG. 14, includes a bearing assembly 66 having gears 70, 72 and a bearing surface 74 configured such that the two gear supports engage an interior surface of the sidewall 58 and the bearing support engages an exterior of the sidewall 59. Further, the sidewall 59 may also have a flange 88 extending from the portion of the sidewall 59 that is adjacent the housing 24 when the rotational drive unit 46 is mounted onto the housing 24. By one approach, the flange 88 may extend from the sidewall 59 toward the rotational axis of the rotational drive unit 46, as illustrated in FIG. 4. In the assembly 66, one of the gears 70, 72 is a pinion gear configured to transmit rotational force to the rotational drive unit 46 and the other is a rotatable idler gear configured to support the position of the rotational drive unit 46 without driving the unit. By another approach, both gears 70, 72 are pinion gears configured to drive the rotational drive unit 46. In addition to the gears 70, 72, the support configuration also includes a bearing surface 74, which may include an arcuate lip 75, as illustrated in FIG. 14. The bearing surface 74, as shown, has a surface configured to slidingly support the rotational drive unit 46. In short, the bearing assembly of FIG. 14 has three points of support for the rotational drive unit 46, one engaging the outside surface of the rotational drive unit 46 (bearing surface 74) and two engaging the interior surface of the rotational drive unit 46 (gears 70, 72) via the sun gear 52.

In another illustrative embodiment, shown in FIG. 15, a bearing assembly 67 includes a bearing surface 76 and gears 78, 80. The bearing surface 76 slidingly engages the outer surface of the rotational drive unit 46, specifically the sidewall 58. Further, in one embodiment, the sidewall 58 includes an outwardly extending flange 79 (FIG. 4) that further engages with the bearing surface 76 and extends from the sidewall 58 in a direction away from the rotational center of the rotational drive unit 46.

The gears 78, 80 engage the inside of the sun gear 52 on the inside surface of the rotational drive unit 46. More particularly, the gear teeth of the sun gear 52 are disposed on the sidewall 58 on an inside surface thereof facing the rotational axis of the rotational drive unit 46. The gears 78, 80, like gears 70, 72, are positioned to engage the teeth of the sun gear 52 located on the interior surface of the sidewall 58 of the rotational drive unit 46. In one illustrative embodiment, the gears are positioned at one o'clock and eleven o'clock to provide support for the rotational drive unit and such a configuration provides distributed support through both gears. Further, either or both of the gears 78, 80 may be driving gears.

Yet another example bearing assembly 68 is illustrated in FIG. 16 and has three gears 82, 84, 86. In this bearing assembly 68 configuration, two gears 82, 84 are positioned inside rotational drive unit 46 to engage the sun gear 52 and the gear 86 is positioned to engage the outside surface of the rotational drive unit. However, if a gear is positioned on the outside of drive unit 46, corresponding gear teeth would be positioned about the outside circumference of the rotational drive unit 46. To avoid having to incorporate gear teeth to the outside surface of the drive unit 46, another approach incorporates three gears engaging the inside surface of rotational drive unit 46 having sun gear 52 disposed thereon.

As incorporated into the movable barrier operator 10, the three-points of support engage the rotational drive unit 46 including the sun gear 52 along a circumference of the drive unit 46 including both the larger circumference along the sidewall 58 and the smaller circumference along sidewall 59. Thus, the housing 24, which has the bearing assembly with the three-points of support, is operably connected to the rotational drive unit at the circumference of the rotational drive unit 46. The circumference may be on the inner surface, outer surface, or both surfaces of the rotational drive unit 46. More particularly, as used herein the circumference may include the inner and outer surfaces of the sidewall 58, the flange 79, along with the inner and outer surfaces of the sidewall 59 and the flange 88. By one approach, the sun gear 52 is disposed on an interior surface of the larger circumference (sidewall 58) of the rotational drive unit 46 such that a driving or pinion gear is configured to rotate the sun gear 52 and rotational drive unit 46, while other bearings may support the rotational drive unit 46 at the circumference such as through arcuate surfaces or idler gears or at the smaller circumference (sidewall 59). More specifically, the rotational drive unit 46 may be supported by at least one driving pinion gear and at least one support gear, both of which are positioned off-set from a center of the rotational drive unit 46 and sun gear 52 such that the sun gear 52 and rotational drive unit 46 are not supported by a central bearing. By another approach, a sliding engagement also supports the rotational drive unit 46 along with the gears. As mentioned above, the sliding engagement may include an arcuate lip that can engage either or both sidewalls 58, 59.

The three-points of support configured to rotate and engage the rotational drive unit 46 permit the sun gear to have a substantially hollow center. The substantially hollow center is configured to receive portions of the barrier mount such as an axle to which the movable barrier may be mounted. Further, the rotational drive unit 46 extends below housing 24, which thereby exposes the sun gear 52 below the housing 24, which does not significantly extend below the axle. In addition, this exposure is in a direction facing away from the movable barrier.

To prevent injury and increase the safety of the device, a protection mechanism such as a finger guard may be incorporated into the movable barrier operator. In one illustrative embodiment, the protection mechanism is configured to protect fingers from getting pinched between the sun gear and the operator including the gears such as the pinion gear. In addition, such a guard may also protect other items such as jewelry or clothing from getting inadvertently entangled with the gearing. Further, such a guard may be movable to provide access to the sun gear 52 and closable to cover the sun gear 52. When the guard is in the access position, permitting a user to access the sun gear, the removable portion of the rotational drive unit may be inserted and removed from the remainder of the rotational drive unit, as discussed below.

Figure 6:
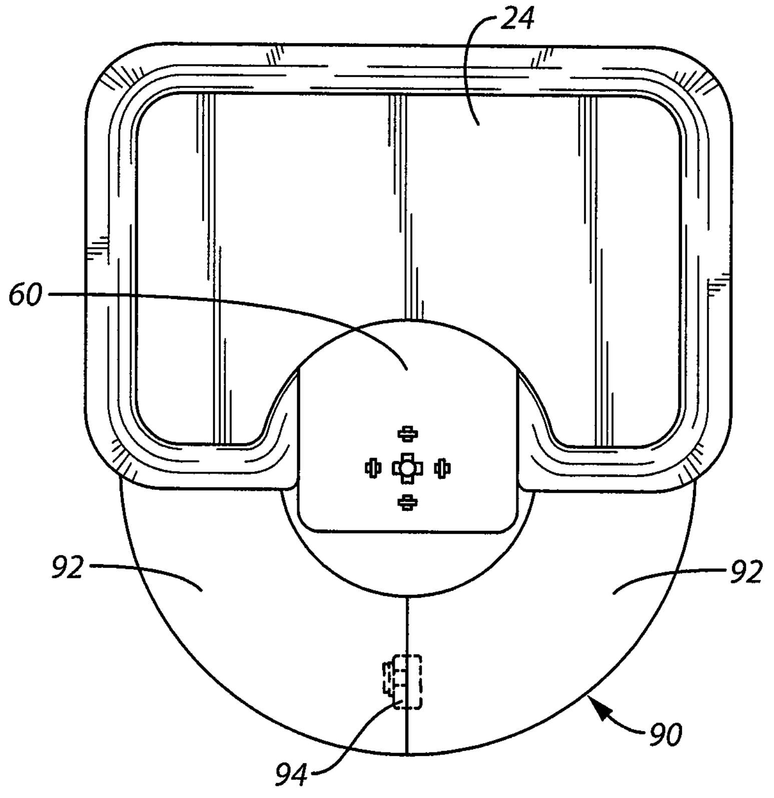
FIG. 6 comprises a back view of the movable barrier operator of FIG. 5 having protection plates in a position covering a portion of the sun gear, as configured in accordance with various embodiments of the invention.
Figure 7:
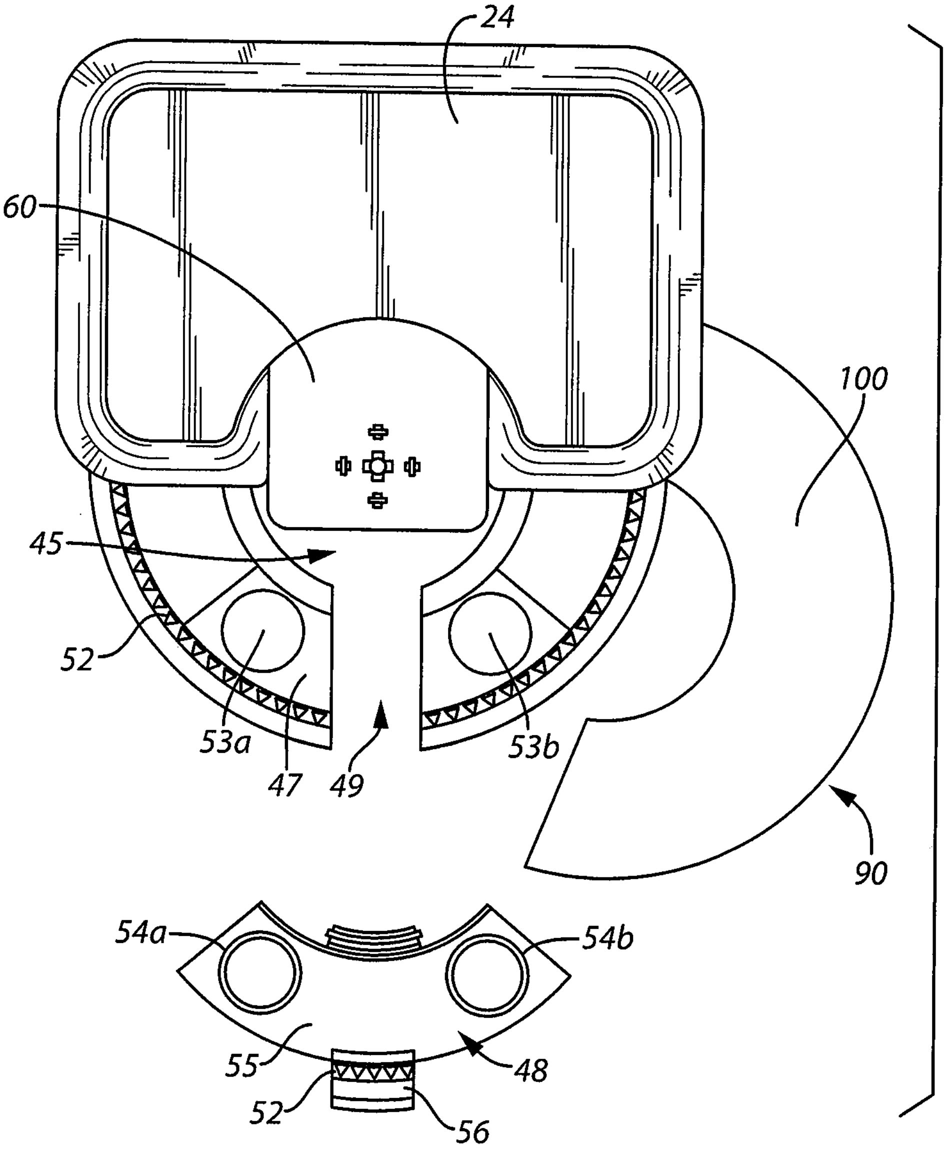
FIG. 7 comprises a back view of a movable barrier operator with an alternative protection plate and having a portion of the associated gear removed, as configured in accordance with various embodiments of the invention.

Turning now to FIGS. 5-7, several embodiments of a protection mechanism or finger guard are illustrated therein. By one approach, a finger guard 90 may be configured in a closed, first position that covers the sun gear 52 and an open, second position that exposes a portion of the side 50 of the rotational drive unit 46 that faces the housing 24. As mentioned above, a central bearing is not required to position the rotational drive unit 46 about the axle 36. In such a configuration, the rotational drive unit may extend a distance below the housing 24. By extending the rotational drive unit 46 beyond the housing 24, a portion of the sun gear 52 extends beyond the housing 24. When the finger guard 90 is in the first position, the portion of the sun gear 52 that extends beyond the housing 24 is substantially covered by the finger guard.

As illustrated in FIG. 5, the finger guard 90 may include two c-shaped plates 92. In the closed, first position, the c-shaped plates 92 follow the annular shape of the rotational drive unit 46. The closed, first position, which substantially covers the portion of the sun gear 56 that extends beyond the motor housing 24, is employed during operation of the operator, once the removable portion 48 of drive unit 46 is secured. In the open, second position, the c-shaped plates 92 are spread outwardly, thereby substantially exposing a portion of the sun gear 52 that extends beyond the motor housing 24. By one approach, the finger guard 90 may be configured to a locked position and an unlocked position, wherein the locked position covers the sun gear 52 and the unlocked position permits access to the opening 49 and the removable portion 48.

FIG. 5 illustrates the c-shaped plates 92 being configured in the second position thereby providing access to the opening 49. FIG. 5 also shows the opening 49 with the removable portion 48 disengaged from the first portion 47 of the rotational drive unit 46. To mate the removable portion 48 with the remainder of the rotational drive unit 46, the c-shaped plates are configured to be in the second, open position. As can be seen in FIG. 5, the teeth of the sun gear 52 are disposed on both the removable portion 48 and the first portion 47 of the rotational drive unit 46. When the projections 54 of the removable portion 48 are inserted through the apertures 53, the projections 54 are positioned to engage the movable barrier and the pinion gear assembly 68 may engage the sun gear 52 that is disposed on both the removable portion 48 and the first portion 47 of the rotational drive unit 46. Further, once the removable portion 48 has been mated with the first portion 47, the c-shaped plates 92 may be moved to the first, closed position, illustrated in FIG. 5. Further, the c-shaped plates 92 may have a clasp or locking mechanism 94. The locking mechanism 94 may include a lock projection 96 on one of the c-shaped plates 92 that mates with lock opening on the other of the c-shaped plates 92.

The c-shaped plates 92 are connected to the housing 24 such that the plates are movable. For example, the plates 92 may rotate or slide open to provide access to the sun gear 52 and then rotate or slide closed to cover the sun gear 52. The c-shaped plates 92 are illustrated in FIG. 14 having the rotational drive unit 46 removed, thereby illustrating the bearing assembly 66 and the c-shaped protection plates 92. By one approach, c-shaped plates 92 are pivotally connected to housing 24 such that they may pivot with respect to a connection point to the housing 24. As illustrated in FIG. 14, in one illustrative embodiment, the c-shaped plates 92 are pivotally connected to housing 24 at the bearings, specifically at gears 70, 72.

Another configuration of the finger guard 90 is illustrated in FIG. 7 and includes an annular plate 100. The annular plate 100 is constructed as a single piece and corresponds to the annular shape of the rotational drive unit 46, specifically the portion of the rotational drive unit 46 that extends beyond the housing 24. Further, the annular plate 100 connects to the housing 24 through one connection. By one approach, the annular plate 100 is pivotally connected to the housing 24. By another approach, the annular plate 100 may be slidably connected to the housing. Like the finger guard of FIGS. 4-6, the finger guard of FIG. 7 covers a portion of the sun gear 52 that extends below the housing 24. Further, both of the finger guards 90 including the finger guard with c-shaped plates 92 and the finger guard with the annular plate 100 (FIGS. 5 and 7) are positioned in between the housing 24 and the rotational drive unit 46. Thus, when the annular plate 100 is in a locked or closed position, the sun gear 52 is not openly exposed. FIG. 7 also illustrates that the removable portion 48 may be mated with the remainder of the rotational drive unit 46 when the annular plate 100 is in the unlocked or open position.

The finger guard 90 is configured to protect and cover the sun gear 52. In addition, having the protection plate(s) or finger guard 90 movable from the covering position to an open position, permits the removal or insertion of the removable portion 48 of the sun gear 52. Thus, by configuring the finger guard 90 in the open position, the removable portion 48 may be mated with the remainder of the rotational drive unit 46 and with the movable barrier 20. In short, during installation of the movable barrier operator 10, the finger guard 90 is positioned in the open positioned to permit the projections 54 of the removable portion 48 to pass through the apertures 53 and to engage the wheel 38 onto which the movable barrier 20 is mounted. By having the finger guard 90 movable between two positions, one permitting installation of the removable portion 48 and one covering sun gear 52 during operation, the finger guard 90 may be mounted to the operator prior to installation of the operator 10 onto a previously mounted garage door.

Figure 17:
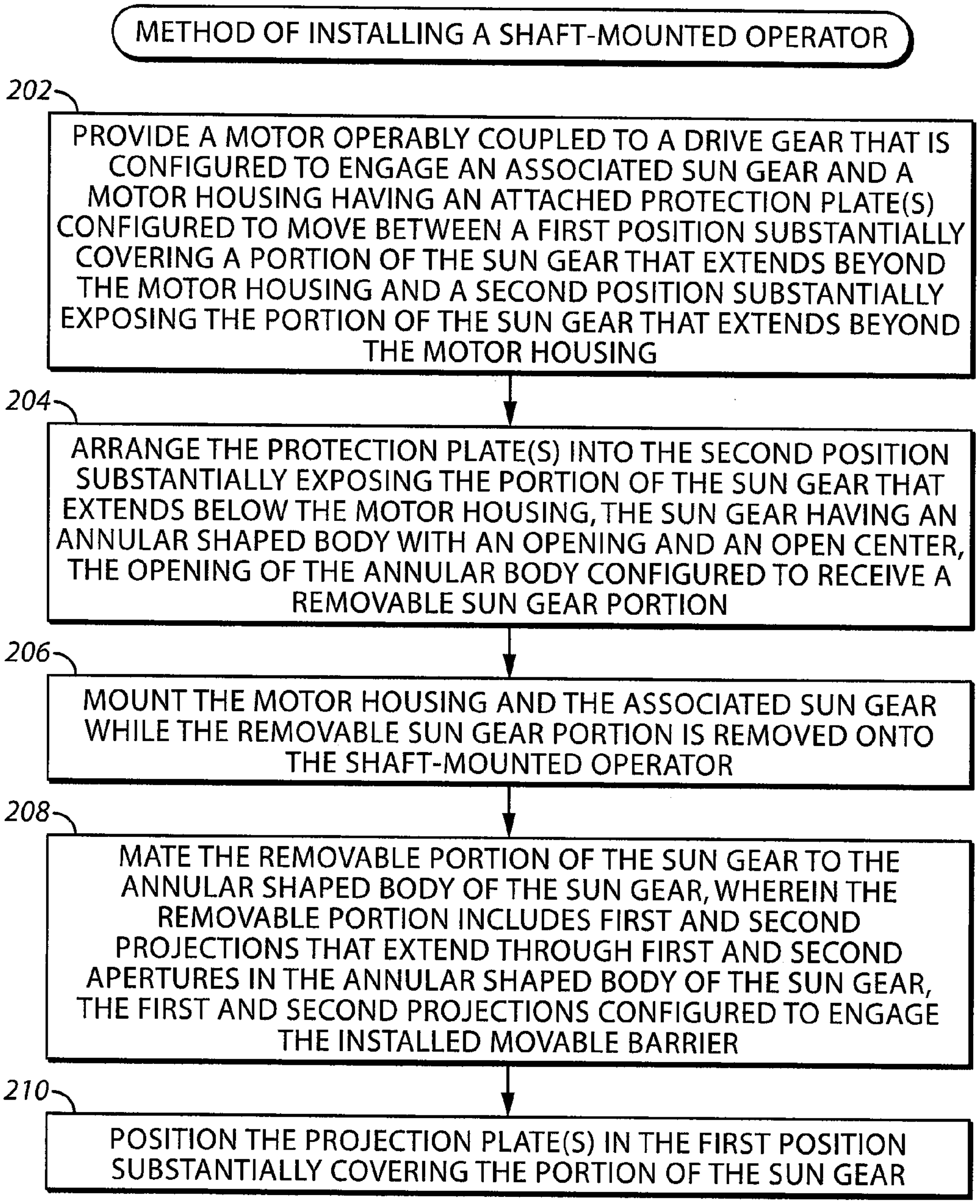
FIG. 17 comprises a block diagram of a method of installation, as configured in accordance with various embodiments of the invention.

Turning now to FIG. 17, a method 200 of installing a shaft-mounted operator is illustrated. At the beginning, an installer is provided 202 a motor operably coupled to a drive gear that is configured to engage an associated sun gear and a motor housing having an attached finger guard or protection plate(s) configured to move between a first position substantially covering a portion of the sun gear that extends beyond the motor housing and a second position substantially exposing the portion of the sun gear extending beyond the motor housing. To install movable barrier operator 10 onto a previously installed movable barrier, the installer arranges 204 the finger guard or protection plates into the first position that substantially exposes the portion of the rotational drive unit and the sun gear that extends below housing 24. Thus, the installer may begin by opening the finger guard such that the removable portion 48 may be mated to opening 49 of rotational drive unit 46.

Once the finger guard is positioned to expose the sun gear 52, then, the motor housing and the associated rotational drive unit with the removable portion removed may be mounted 206 onto the axle 36 adjacent the wheel 38 while the removable portion 48 is removed. To this end, an expandable shaft coupling may be used to attach a support 60 of the housing 24 to the axle 36. Once the housing 24 is secured to adjacent the wheel 38, the removable portion 48 may be mated 208 with the remainder of the rotational drive unit such that the portion of the sun gear 52 on the removable portion is mated with the sun gear 52 portion that is disposed on the rotational drive unit. Further, the removable portion 48 mates the movable barrier operator 10 to the garage door via placement of portions of the removable portion 48 around portions of the wheel 38 to which the door 20 is mounted. To this end, the projections 54 of the removable portion 48 may be extended through the apertures 53 that are proximate the opening 49 of the rotational drive unit 46. As the projections 54 are extended through the apertures 53, the projections engage portions of the previously installed movable barrier including spokes 40 of the wheel 38. After mating the removable portion 48 with the opening 49 of the rotational drive unit 46 via mating projections 54 with spokes 40, the finger guard 90 is positioned 210 into the first position substantially covering the portion of the sun gear 52 that extends beyond housing 24.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

I claim:

1. A shaft-mounted operator configured to drive a movable barrier between a first and a second position, the operator comprising:

a motor having a motor housing;

a drive gear operably connected to the motor;

a sun gear engaging the drive gear along a circumference of the sun gear, the sun gear being configured to couple with a movable barrier to move the movable barrier between a first position and a second position;

at least one sun gear support; and wherein the drive gear and the at least one sun gear support are positioned off-set from a center of the sun gear and engage the circumference of the sun gear and wherein the sun gear is not supported by a central bearing.

2. The shaft-mounted operator of claim 1, wherein the at least one sun gear support comprises a first sun gear support and a second sun gear support positioned off-set from the center of the sun gear.

3. The shaft-mounted operator of claim 1 wherein the at least one sun gear support comprises a rotatable, idler gear.

4. The shaft-mounted operator of claim 1 wherein the at least one sun gear support comprises an arcuate lip.

5. The shaft-mounted operator of claim 2 wherein the drive gear and the first sun gear support engage an inner surface of the circumference of the sun gear and the second sun gear support engages an outer surface of the circumference of the sun gear.

6. The shaft-mounted operator of claim 1 wherein the sun gear defines a substantially hollow center configured to receive a portion of a support for the movable barrier.

7. The shaft-mounted operator of claim 1 wherein the sun gear extends beyond the motor housing and comprises a first portion and a second portion, the second portion being removable from the first portion.

8. The shaft-mounted operator of claim 1 wherein the sun gear extends beyond the motor housing, the shaft-mounted operator further comprising a first protection plate and a second protection plate, the first protection plate and the second protection plate being pivotally connected to the motor housing wherein the first and the second protection plates are pivotal between a first position and a second position, the first position substantially covering a portion of the sun gear extending beyond the motor housing facing away from a movable barrier connection and the second position exposing the portion of the sun gear extending beyond the motor housing.

9. A shaft-mounted operator configured to be installed to operably engage a previously installed movable barrier to drive the movable barrier without removing the movable barrier, the shaft-mounted operator comprising:

a motor having a motor housing; and a sun gear operably connected to and driven by the motor, wherein the sun gear comprises a first portion and a removable second portion, wherein the removable second portion is removable from the first portion allowing assembly of the sun gear on the shaft without removal of the shaft from its installation;

wherein assembly of the sun gear includes assembling the first portion and the removable second portion; and the first portion of the sun gear further includes an opening configured to receive the removable second portion and a first aperture and a second aperture, the first aperture and the second aperture positioned proximate the opening in the sun gear.

10. The shaft-mounted operator of claim 9, wherein the removable second portion of the sun gear includes a body from which a first leg and a second leg extend in one direction and arcuate flanges extend in the opposite direction.

11. The shaft-mounted operator of claim 10 wherein the first leg of the removable second portion is configured to extend through the first aperture of the first portion and the second leg of the removable second portion is configured to extend though the second aperture of the first portion.

12. The shaft-mounted operator of claim 11 wherein the first and second legs extending through the first and second apertures are configured to engage an installed movable barrier, the first and second legs being operable to move the installed movable barrier from a first position to a second position.

13. The shaft-mounted operator of claim 9 wherein the removable second portion is configured to operably engage the movable barrier when engaging the first portion of the sun gear.

14. The shaft-mounted operator of claim 9 wherein the first portion of the sun gear is configured to be slidably mounted on a previously installed movable barrier without removing the movable barrier and the removable second portion is connectable to the first portion when the first portion is mounted on the previously installed movable barrier.

15. The shaft-mounted operator of claim 9, the sun gear further comprising gear teeth on an inner surface of a circumference of the first portion and the removable section portion of the sun gear.

16. The shaft-mounted operator of claim 9 wherein the sun gear is incorporated into a rotational drive unit that further includes strengthening ribs that reinforce the rotational drive unit.

17. The shaft-mounted operator of claim 9 further comprising a first protection plate and a second protection plate, the first protection plate and the second protection plate being connected to the motor housing, wherein the first protection plate and the second protection plate are movable between a first position and a second position, wherein when in the first position the first protection plate and the second protection plate substantially cover a portion of the sun gear extending beyond the motor housing facing away from a movable barrier connection and when in the second position the first protection plate and the second protection plate expose the portion of the sun gear extending beyond the motor housing.

18. The shaft-mounted operator of claim 17 wherein when the first and second protection plates are positioned in the second position the removable second portion of the sun gear is removable from the first portion between the first protection plate and the second protection plate.

19. The shaft-mounted operator of claim 9 further comprising:

a drive gear operably connected to the motor;

at least one sun gear support disposed on the motor housing; and the sun gear engaging the drive gear along a circumference of the sun gear;

wherein the drive gear and the at least one sun gear support are positioned off-set from a center of the sun gear and engage the circumference of the sun gear wherein the sun gear is not supported by a central bearing, and wherein the sun gear is configured to couple to the previously installed movable barrier to move the previously installed movable barrier between the first and second position.

20. An apparatus comprising:

a motor having a motor housing;

a sun gear operably connected to and driven by the motor, wherein a portion of the sun gear extends beyond the motor housing;

at least one protection plate connected to the motor housing, wherein the at least one protection plate is movable between a first position and a second position, the first position substantially covering at least one side of a portion of the sun gear extending beyond the motor housing and the second position exposing at least part of the portion of the sun gear extending beyond the motor housing; and wherein the second position of the at least one protection plate is configured to emit removal of a part of the sun gear configured to engage a previously installed movable barrier.

21. The apparatus of claim 20, the sun gear further comprising an annular shaped portion having an opening configured to receive a removable sun gear portion, wherein to permit mounting of the sun gear onto the previously installed movable barrier, the opening of the sun gear is positioned to be exposed when the at least one protection plate is in the second position.

22. The apparatus of claim 21 wherein the annular shaped portion further comprises a first aperture and a second aperture positioned adjacent the opening of the annular shaped portion and wherein when the at least one protection plate is in the second position the first and second apertures of the annular shaped portion of the sun gear are exposed.

23. The apparatus of claim 20 further comprising: a drive gear that drives the sun gear; a support gear that rotatably supports the sun gear; and wherein the at least one protection plate includes first and second protection plates that have holes therein, through which one of either the drive gear or the support gear extend such that first and second protection plates are connected to the motor housing at one of the drive gear and the support gear.

24. The apparatus of claim 23 further comprising a latch wherein a first portion of the latch is associated with the first protection plate and a second portion of the latch associated with the second protection plate, the latch configured to secure the first and second protection plates to one another in the second position.

25. The apparatus of claim 23 further comprising an expandable shaft coupling configured to fixedly connect the motor housing to a hollow axle.

26. The apparatus of claim 25 wherein the sun gear defines an open rotational center and wherein the expandable shaft coupling is positioned at approximately the open rotational center of the sun gear such that the hollow axle is positioned at the open rotational center of the sun gear.

27. The apparatus of claim 25 wherein the expandable shaft coupling comprises a center bolt and at least two wings wherein the at least two wings are configured to expand when the center bold is rotated.

28. A method of installing a shaft-mounted operator to a previously installed movable barrier, the method comprising:

providing a motor having a motor housing, the motor operably coupled to a drive gear configured to engage a sun gear associated therewith, and the motor housing having at least one protection plate attached thereto, the at least one protection plate configured to move between a first position substantially covering a portion of the sun gear that extends beyond the motor housing and a second position substantially exposing the portion of the sun gear;

arranging the at least one protection plate into the second position substantially exposing the portion of the sun gear, the sun gear having an annular shaped body with an opening and an open center, the opening of the annular body configured to receive a removable sun gear portion;

mounting the motor housing and the associated sun gear with the removable sun gear portion removed;

mating the removable portion of the sun gear to the annular shaped body of the sun gear, wherein the removable portion includes a first and a second projections that extend through first and second apertures in the annular shaped body of the sun gear, the first and second projections are configured to engage the installed movable barrier; and positioning the at least one protection plates in the first position substantially covering the portion of the sun gear.

29. The method of claim 28 wherein mounting the motor housing further comprises mounting the motor housing adjacent an end of the installed movable barrier wherein a barrier axle of the movable barrier extends into the open center of the sun gear.

30. A jackshaft operator configured to be installed to drive a barrier between a first and a second position without uninstalling the barrier, the jackshaft operator comprising:

a motor having a motor housing;

a drive gear operably connected to the motor;

a sun gear engaging the drive gear along a circumference of the sun gear, the sun gear being configured to operably couple to a movable barrier via a sun gear removable portion to move the movable barrier between a first and a second position, wherein a portion of the sun gear extends beyond the motor housing to permit removal of the sun gear removable portion;

at least one sun gear support mounted on the motor housing, wherein the drive gear and the at least one support gear are positioned off-set from a center of the sun gear and engage the circumference of the sun gear;

at least one protection plate configured to connect to the motor housing wherein the at least one protection plate is movable between a first position and a second position, wherein when in the first position the at least one protection plate substantially covers a side of the portion of the sun gear extending beyond the motor housing and when in the second position the at least one protection plate exposes at least part of the portion of the sun gear extending beyond the motor housing.

31. The jackshaft operator of claim 30 further comprising a support panel fixedly attached to the motor housing, the support panel having a bore therethrough and a coupler having a center bolt configured to extend through the bore in the support panel and into a center of the coupler to secure the motor housing to the coupler.

32. The jackshaft operator 30 further comprising a coupler configured to fixedly connect the motor housing to a hollow axle, wherein the coupler is configured to expand to contact an inside surface of the hollow axle.

33. The jackshaft operator of claim 32 wherein the coupler further comprises at least two wings configured to expand outwardly when the bolt in the coupler is rotated.

34. The jackshaft operator of claim 33 wherein the coupler is attached to the support plate such that the coupler is positioned at substantially a center of the sun gear.

* * * * *

UNITED STATES PATENT AND TRADEMARK OFFICE

CERTIFICATE OF CORRECTION

PATENT NO. : 8,480,526 B2
APPLICATION NO. : 12/775173
DATED : July 9, 2013
INVENTOR(S) : Scott James Nicholson It is certified that error appears in the above-identified patent and that said Letters Patent is hereby corrected as shown below:

IN THE CLAIMS

Claim 20, Column 17, Line 2: Change “emit” to -- permit --; and

Claim 32, Column 18, Line 49: After “operator” insert -- of claim --.

Signed and Sealed this
Twenty-sixth Day of November, 2013

Margaret A. Focarino

Margaret A. Focarino
*Commissioner for Patents of the United States Patent and Trademark Office*